(12) United States Patent
Recio et al.

(10) Patent No.: US 7,644,231 B2
(45) Date of Patent: Jan. 5, 2010

(54) SELECTIVE INFORMATION CACHING ON DISK DRIVE

(75) Inventors: Renato J. Recio, Austin, TX (US); Johnny Meng-Han Shieh, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 11/201,648

(22) Filed: Aug. 11, 2005

(65) Prior Publication Data

US 2007/0038806 A1 Feb. 15, 2007

(51) Int. Cl.
*G06F 12/00* (2006.01)

(52) U.S. Cl. .................. 711/118; 711/103; 711/112; 711/117

(58) Field of Classification Search .................. None
See application file for complete search history.

(56) References Cited

U.S. PATENT DOCUMENTS

| | | | |
|---|---|---|---|
| 5,971,281 A | 10/1999 | Frary et al. | |
| 6,564,286 B2 * | 5/2003 | DaCosta | 711/103 |
| 6,601,137 B1 * | 7/2003 | Castro et al. | 711/113 |
| 6,662,267 B2 * | 12/2003 | Stewart | 711/113 |
| 6,862,681 B2 | 3/2005 | Cheston et al. | |
| 7,073,054 B2 | 7/2006 | Kim et al. | |

OTHER PUBLICATIONS

Hennessy and Patterson, Computer Architecture—A Quantitative Approach, 1996, Morgan Kaufmann Publishers, second edition, pp. 379-380.*

Zaccai, "SRAM Based Cache for Flash Memory/Disks", Motorola Technical Developments, Sep. 1997, p. 30.

Dang et al., "Reduce Low-End DASD Power by Adding Non-Volatile Memory Buffer", IBM Technical Disclosure Bulletin, vol. 39, No. 3, Mar. 1998, p. 131.

Asano et al., "Fast DASD Processing Method to Write Command", IBM Technical Disclosure Bulletin, vol. 35, No. 3, Aug. 1992, pp. 213-214.

"Microsoft Windows Hardware Showcase—Corporate Area", pp. 1-2, retrieved Mar. 27, 2007 http://www.microsoft.com/whdc/winhec/hwshowcase05.mspx.

Kanellos, "Mobile working Toolkit, Hybrid drive to extend notebook battery life" ZDNet.co.uk, pp. 1-2, retrieved Mar. 27, 2007 http://news.zdnet.co.uk/hardware/0,1000000091,34196323,00.htm.

* cited by examiner

*Primary Examiner*—Reginald G Bragdon
*Assistant Examiner*—Shawn X Gu
(74) *Attorney, Agent, or Firm*—Matthew W. Baca; Yee & Associates, P.C.

(57) ABSTRACT

A non-mechanical persistent storage is provided for a mechanical storage device. The operating system instructs the mechanical storage device to cache ranges of data stored in the mechanical storage device in the non-mechanical persistent storage. The mechanical storage device then transfers the data to the non-mechanical persistent storage. When the operating system makes a write to a range that is tracked in the non-mechanical persistent storage, the data is written to the mechanical storage and mirrored to the non-mechanical persistent storage. When the operating system makes a read to a range that is tracked in the non-mechanical persistent storage, such as when the system is in startup, the data is read from the non-mechanical persistent cache.

10 Claims, 5 Drawing Sheets

SELECTIVE INFORMATION CACHING ON DISK DRIVE

BACKGROUND OF THE INVENTION

1. Field of the Invention

The present invention relates generally to data transfer between a host system and an input/output (I/O) storage device. More specifically, the present invention provides a method by which data is accessed, at a faster rate, from non-volatile or persistent memory instead of magnetic media on a mechanical storage device.

2. Description of the Related Art

Operating Systems in particular have needs of inspecting certain areas of a storage device, such as a hard disk drive, to gather information vital to the process of starting up the system. For example, to install the Advanced Interactive Executive (AIX™) operating system, the Volume Group Descriptor Area (VGDA), among other things, has to be accessed. Since a hard disk drive is a mechanical storage device, this requires that the disk spins and the read/write head(s) be positioned to read the data. This creates a delay caused by the time it takes to start the disk's motors, to position the reading heads, and to perform the read.

The I/O wait associated with mechanical storage devices is not a critical concern unless the system has a significant number of drives. For example, a system may have thousands of hard disk drives. In this case, inspection of these drives could take hours, creating a performance problem. However, even in the case of a single mechanical storage device, as with a typical personal computer, the I/O wait may be a nuisance.

There is no current solution to avoid this I/O wait as described above. Hard disk drives and other mechanical storage media, such as optical drives and tape drives, for example, do not currently have a way to maintain, across power and reset cycles, a copy of data stored in disk sectors.

SUMMARY OF THE INVENTION

The present invention recognizes the disadvantages of the prior art and provides a non-mechanical persistent storage associated with a mechanical storage device. The operating system instructs the mechanical storage device to cache ranges of data stored in the mechanical storage device in the non-mechanical persistent storage. The mechanical storage device then transfers the data to the non-mechanical persistent storage. When the operating system makes a write to a range that is tracked in the non-mechanical persistent storage, the data is written to the mechanical storage and mirrored to the non-mechanical persistent storage. When the operating system makes a read to a range that is tracked in the non-mechanical persistent storage, such as when the system is in startup, the data is read from the non-mechanical persistent cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
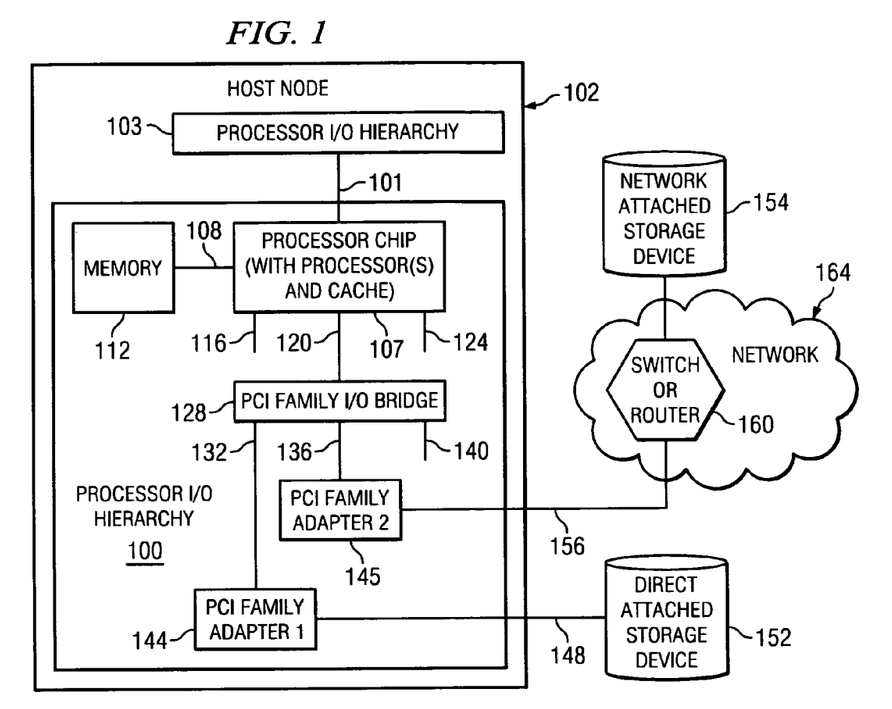
FIG. 1 is a block diagram of a data processing system in accordance with exemplary aspects of the present invention.
Figure 2:
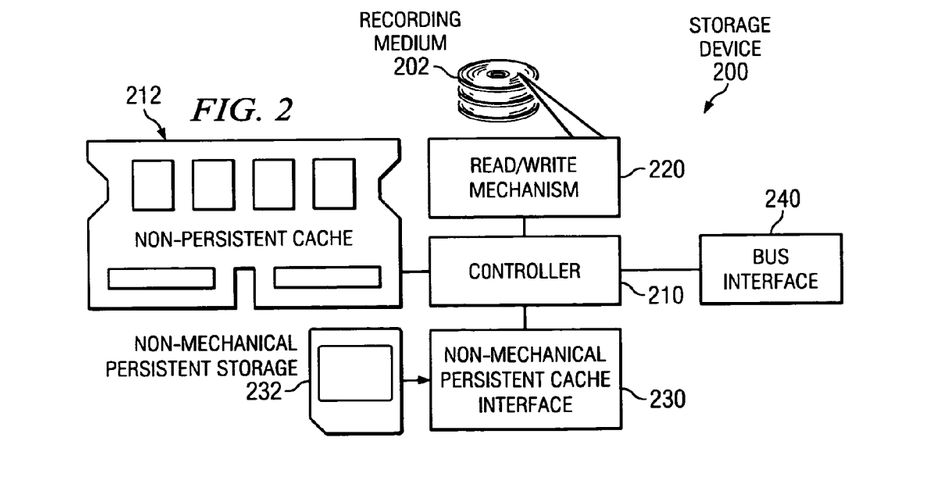
FIG. 2 is a block diagram of a storage device in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

Referring to FIG. 1, a block diagram of a data processing system is depicted in accordance with exemplary aspects of the present invention. Host node 102 may be a symmetric multiprocessor (SMP) system including a plurality of processor input/output (I/O) hierarchies 100 and 103. Alternatively, a single processor system may be employed, in which case there may be one processor I/O hierarchy, such as processor I/O hierarchy 100. In the depicted example, processor I/O hierarchies 100 and 103 are connected through system bus 101.

Processor I/O hierarchy 100, for example, includes processor chip 107, which may include one or more processors (cores) and cache memory. Cache memory may be dedicated individual processors or may be shared among processors. Processor chip 107 is connected to memory 112 via memory bus 108. Processor chip 107 may also be connected to system busses 116, 120, 124.

Peripheral component interconnect (PCI) family I/O bridge 128, which is connected to system bus 120, provides an interface to PCI busses 132, 136, and 140. A number of PCI adapters may be connected to PCI busses 132, 136, 140. In the depicted example, PCI family adapter 1 144 is connected to PCI bus 132 and PCI family adapter 2 145 is connected to PCI bus 136. A Typical PCI bus implementation may support four PCI expansion slots or add-in connectors, for example. PCI devices, such as graphics adapters and network adapters may be connected to PCI adapters 144, 145.

Additional PCI family I/O bridges (not shown) may provide interfaces for additional PCI local buses, from which additional devices, such as modems, graphics adapters, storage devices, and the like. In this manner, host node 102 allows connections to multiple network computers and storage devices.

In the example illustrated in FIG. 1, PCI family adapter 1 144 is connected to direct attached storage 152, while PCI family adapter 2 145 is connected to switch or router 160 in network 164, through which PCI adapter 145 is connected to network attached storage 154. A data processing system, such as host node 102, may be connected to thousands of storage devices. Therefore, while the example shown in FIG. 1 depicts two storage devices, host node 102 may be connected to more or fewer such devices depending on the implementation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM eServer™ pSeries® system, a product of International Business Machines Corporation in Armonk, N.Y., running the Advanced Interactive Executive (AIX™) operating system or LINUX operating system. (eServer, pSeries, and AIX are trademarks of International Business Machines Corporation in the United States, other countries, or both, while LINUX is a trademark of Linus Torvalds in the United States, other countries, or both).

In accordance with exemplary aspects of the present invention, direct attached storage 152 and network attached storage 154 may be mechanical storage devices, such as hard disk drives or arrays of drives, optical disk drives, magnetic tape drives, and the like. A hard disk drive, for example, requires that the disk spins and the read/write head(s) be positioned to read or write the data. This creates a delay caused by the time it takes to start the disk's motors, to position the reading heads, and to perform the access operation.

For purposes of illustration, storage 152 and storage 154 may be hard disk drives that communicate with PCI adapters 144 and 145, which may be small computer system interface (SCSI) adapters. SCSI is a hardware interface that allows for the connection of peripheral devices to a PCI board, called a SCSI host adapter. SCSI uses a bus structure and functions like a mini-network connecting sixteen devices, although the host adapter counts as one device. SCSI allows any two devices to communicate at one time (host to peripheral, peripheral to peripheral). A person skilled in the art will appreciate that other hardware interfaces may be used, such as the integrated drive electronics (IDE) interface or the serial advanced technology attachment (Serial ATA) interface, for example.

The I/O wait associated with mechanical storage devices is not a critical concern unless the system has a significant number of drives. However, even in the case of a single mechanical storage device, as with a typical personal computer, the I/O wait may be a nuisance.

In accordance with an illustrative embodiment of the present invention, the problem of I/O latency associated with mechanical storage devices is to be lessened by adding non-mechanical persistent memory to a disk drive coupled with the ability of a device driver to communicate through either a proprietary field (e.g., Mode Select) or standard field (e.g., add a field to a SCSI Write) in a command, such as a standard SCSI command. The command may include an address range, such as a linear block address (LBA) range, to cache in non-mechanical persistent memory.

After the disk knows which address range to cache in non-mechanical persistent memory, the following logic is implemented on the disk:
1) On writes within the address range that is cached in non-mechanical persistent memory, the disk writes to both the sectors that are within the address range that is cached in non-mechanical persistent memory and the mechanical storage device.
2) On reads within the address range that is cached in non-mechanical persistent memory, the device does not perform a mechanical operation, but instead sends the data from its non-mechanical persistent memory cache.

This approach provides a benefit, because when the system is starting (booting), mechanical reads that may have a large performance penalty may be avoided. For example, when data is read from a hard disk drive, the read requires: (a) waiting for the disk's motors (head and cylinder) to reach full speed and (b) waiting for the disk mechanicals to reach the associated cylinder, head, and record number. The latency associated with disk power-up mechanical reads is in the order of tens of milliseconds. With the use of non-mechanical persistent storage, the latency is in the order of normal system memory access, which may be measured in microseconds if the disk is attached through I/O links like PCI and SCSI, or nanoseconds if the persistent memory is attached closer to the system memory.

This idea allows an operating system to flag an address range on the disk that will be cached. For an operating system like AIX™, which has a logical volume manager, this could be used to store boot image data on a non-mechanical persistent memory associated with the mechanical storage device for quick access at boot time. Alternatively, or in addition, it could be used to store the volume data (e.g., VGDA for AIX) and satisfy queries without the need to spin the disk. In the case mentioned above where queries to thousands of disks may take hours, with the implementation of the exemplary aspects of the present invention, the same queries could probably take minutes if not seconds.

For Windows NT® file system (NTFS), the non-mechanical persistent storage can be used to store the master file table in NTFS, a portion of the master file table, or the boot file. Similarly, for Windows® file allocation table (FAT), the non-mechanical persistent storage can be used to store the master file table in NTFS, a portion of the master file table, or the boot file.

A consequential advantage may also be the availability of the data in the flash in the event that the portion of the disk containing logical volume manager structure (e.g., VGDA), master file table, or FAT data is inaccessible due to an error, but other parts of the disk are accessible. In this case, the non-mechanical persistent memory cache can be used to access files stored on the disk.

With reference now to FIG. 2, a block diagram of a storage device is shown in which aspects of the present invention may be implemented. Storage device 200 is an example of a storage device, such as direct attached storage 152 or network attached storage 154 in FIG. 1. Storage device 200 includes recording medium 202, controller 210, read/write mechanism 220, and bus interface 240. Controller 210 receives I/O requests from a host device, such as host node 102 in FIG. 1, through bus interface 240. Based on received I/O requests, controller 210 effectuates the requested operations by reading from or writing to recording medium 202 using read/write mechanism 220.

If recording medium 202 is an array of magnetic disk platters, for example, read/write mechanism 220 may include a read/write head arm and servos. If recording medium 202 is an optical disk, then read/write mechanism may include a laser device, for instance. While the example depicted in FIG. 2 shows a circular recording medium, other types of mechanical storage may be used within the scope of the present invention, such as magnetic tape, for example.

Controller 210 may be coupled to non-persistent cache 212. As data is read from or written to recording medium 202, controller 210 may write this data to non-persistent cache 212, which may be a volatile memory, such as dynamic random access memory (DRAM) or the like. Non-persistent cache 212 may be used for temporary storage of frequently or recently accessed blocks of data to improve device performance.

In accordance with an illustrative embodiment of the present invention, controller 210 is also coupled to non-mechanical persistent cache interfaced 230. Non-mechanical persistent storage 232 is coupled to interface 230. Non-mechanical persistent storage 232 is referred to herein as a "cache," because it acts as a staging area for data being written to or read from storage medium 202 to speed up access time, although non-mechanical persistent storage 232 is more permanent than a typical volatile cache memory and is not likely to be constantly changing like a prior art "disk cache."

In one exemplary embodiment, non-mechanical persistent storage 232 is permanently coupled to interface 230; however, in an alternative embodiment, non-mechanical persistent storage 232 may be removably coupled to interface 230. Non-mechanical persistent storage 232 may be referred to as "flash memory," which is a rewritable memory chip that holds its contents without power. Examples of flash memory include Type II PC cards, CompactFlash™, SmartMedia™, Memory Stick™, and Secure Digital™ (SDT™).

Controller 210 may receive an I/O request designating a range of addresses to copy from recording medium 202 to non-mechanical persistent cache 232. Thereafter, when controller 210 receives an I/O write request for data within the range of addresses being tracked in non-mechanical persistent cache 232, controller 210 writes the data to recording medium 202 and mirrors the data to non-mechanical persistent storage 232. When controller 210 receives an I/O read request, the controller determines whether the data being requested is at least partially stored in non-mechanical persistent storage 232. If so, then the data is read from non-mechanical persistent storage 232; otherwise, the data is read from non-persistent cache 212 or recording medium 202. By accessing data in non-mechanical storage whenever possible, storage device 200 avoids much of the I/O latency associated with mechanical storage.

While non-mechanical persistent storage 232 is shown being coupled to controller 210 through non-mechanical persistent cache interface 230, non-mechanical persistent storage 232 may also be connected to a data processing system or computer through other connection interfaces. For example, non-mechanical persistent storage 232 may be connected to a data processing system through a card reader, universal serial bus (USB) port, or the like. Thus, data within the range of addresses may be stored in storage 232, which may be removable. As such, storage 232 may be used as a key without which the data processing system will not boot. Also, storage 232 may be used for failover. When the mechanical storage device fails, storage 232 may be transferred to a replacement storage device.

Figure 3A:
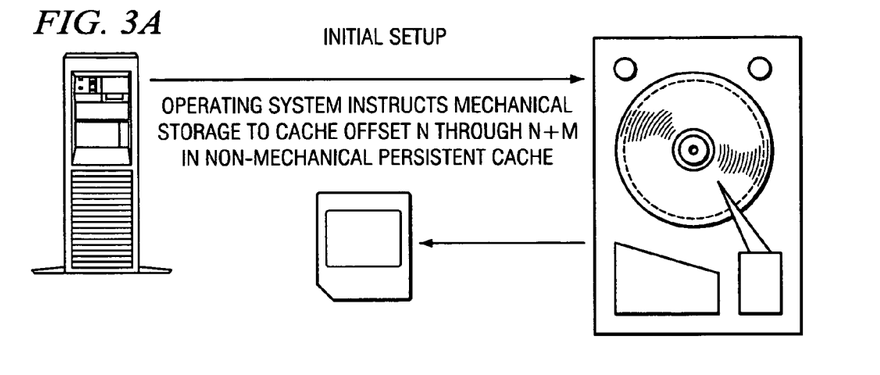
FIGS. 3A-3C illustrate the operation of a storage device in accordance with exemplary aspects of the present invention.
Figure 3B:
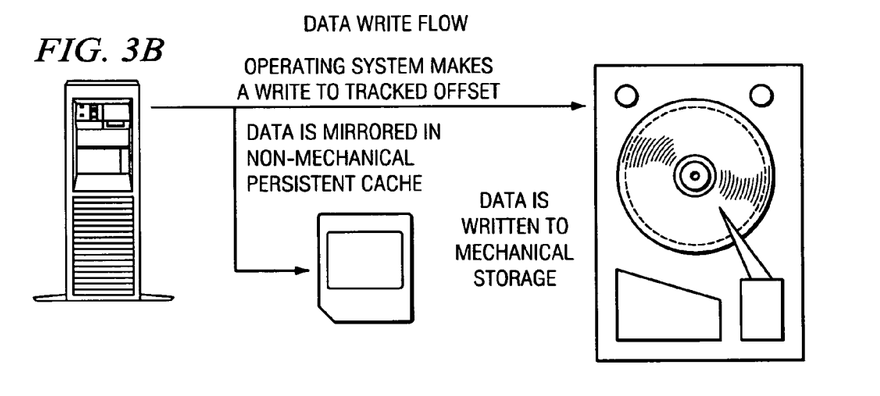
Figure 3C:
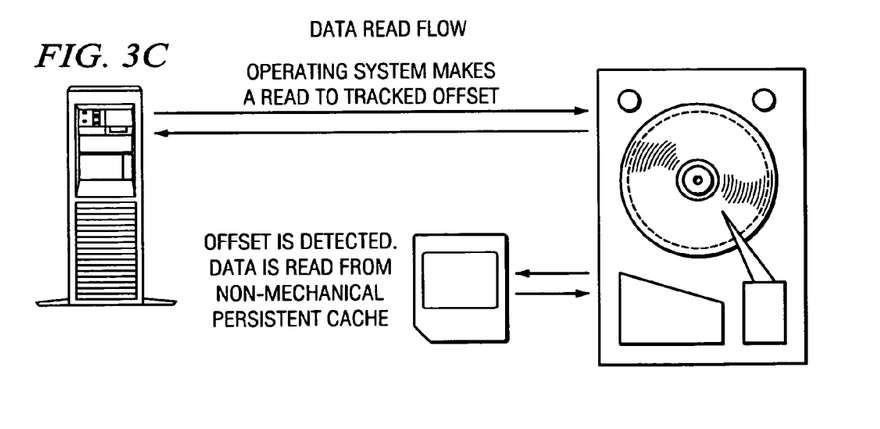

FIGS. 3A-3C illustrate the operation of a storage device in accordance with exemplary aspects of the present invention. In reference to FIG. 3A, the operating system instructs the mechanical storage to cache offset N through N+M into non-mechanical persistent storage. The storage device then copies the range of address (N to N−M) to the non-mechanical persistent cache. Since the non-mechanical cache is persistent, it may be used for failover when the mechanical storage fails in addition to improving access speed.

In FIG. 3B, the operating system makes a write to the tracked offset. The storage device writes the data to mechanical storage and mirrors the data in non-mechanical persistent cache. As such, the integrity of data in the non-mechanical persistent cache, as well as the mechanical storage, is maintained.

In FIG. 3C, the operating system makes a read to the tracked offset. The storage device detects the offset. Since the read is for addresses within the range of addresses in the non-mechanical persistent cache, the storage device reads the data from the non-mechanical persistent cache. By reading data from non-mechanical storage whenever possible, the storage device avoids much of the I/O latency associated with mechanical storage.

Figure 4:
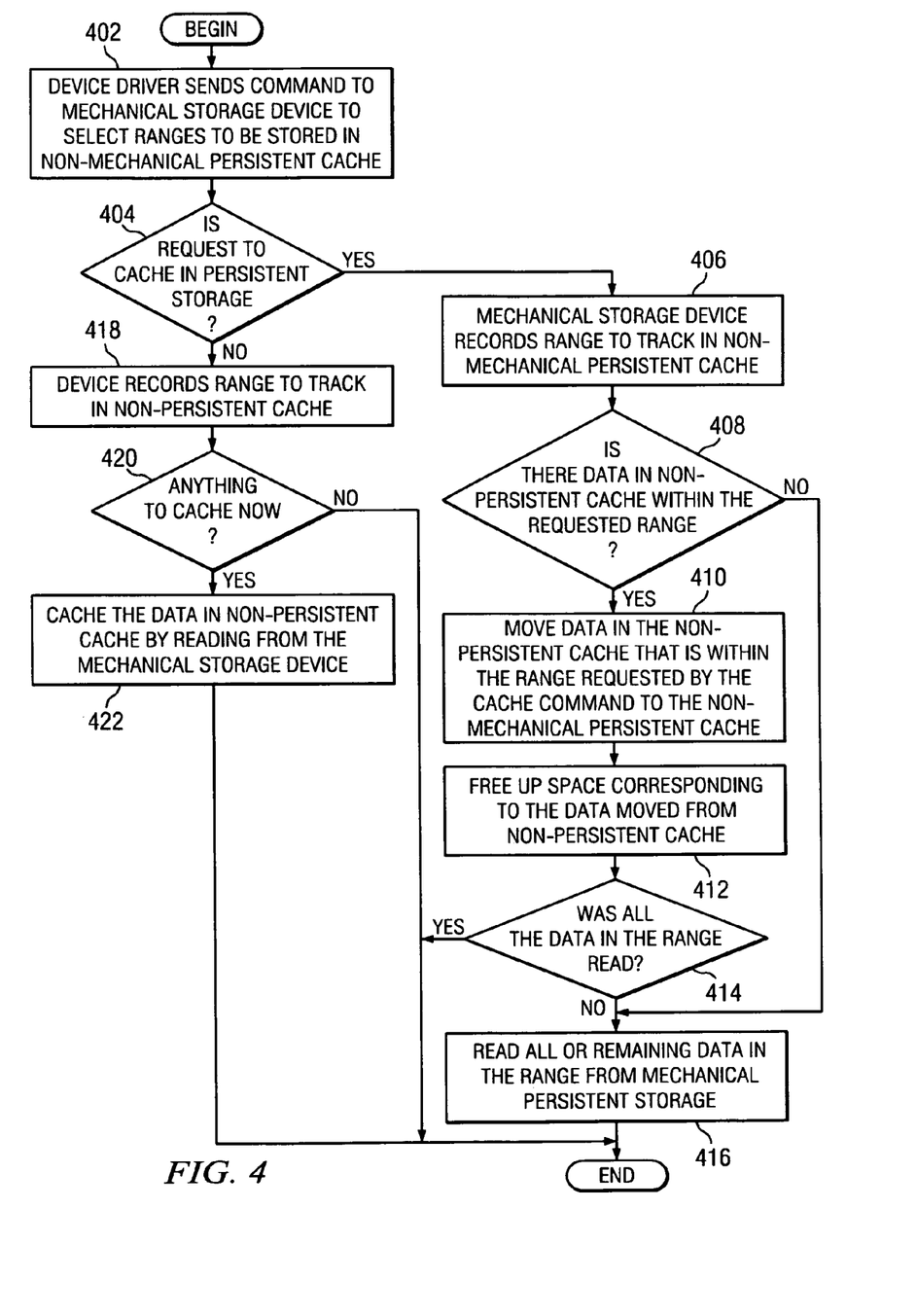
FIG. 4 is a flowchart illustrating the operation of a setup phase in a storage device in accordance with an exemplary embodiment of the present invention.

With reference now to FIG. 4, a flowchart illustrating the operation of a setup phase in a storage device is shown in accordance with an exemplary embodiment of the present invention. For this phase, the device driver of an initiator of an I/O operation sends a command to the target storage device to communicate the device(s) and range(s) that will have data cached and in what memory mode (block 402).

The device determines whether the data is to be cached in persistent memory or non-persistent memory (block 404). If the data is to be cached in persistent memory, the device will record the range to track (block 406) and then determine if there is any data at that time in non-persistent cache that is within the requested range to track (block 408). If some or all the data can be found in the non-persistent cache then it is moved to the persistent cache (block 410). The moved data is then cleared from the non-persistent cache (block 412).

The device then determines whether all of the data requested by the cache is in the range tracked in non-persistent cache (block 414). If all the data requested by the cache command was obtained from the non-persistent cache, then operation ends. If there is no data on non-persistent cache in block 408, then all the data that was requested to be cached is read from the mechanical storage medium (block 416) and operation ends.

Returning to block 404, if the data is to be cached on non-persistent memory, the device tracks the range to cache in its non-persistent cache (block 418). For a hard disk, this may be internal volatile cache memory. The device then determines whether there is currently any data to cache at the tracked range (block 420). If there is no data to cache at the tracked range, then operation ends; otherwise, if there is data to cache at the tracked range in block 420, the device caches the data (block 422) and operation ends.

Figure 5:
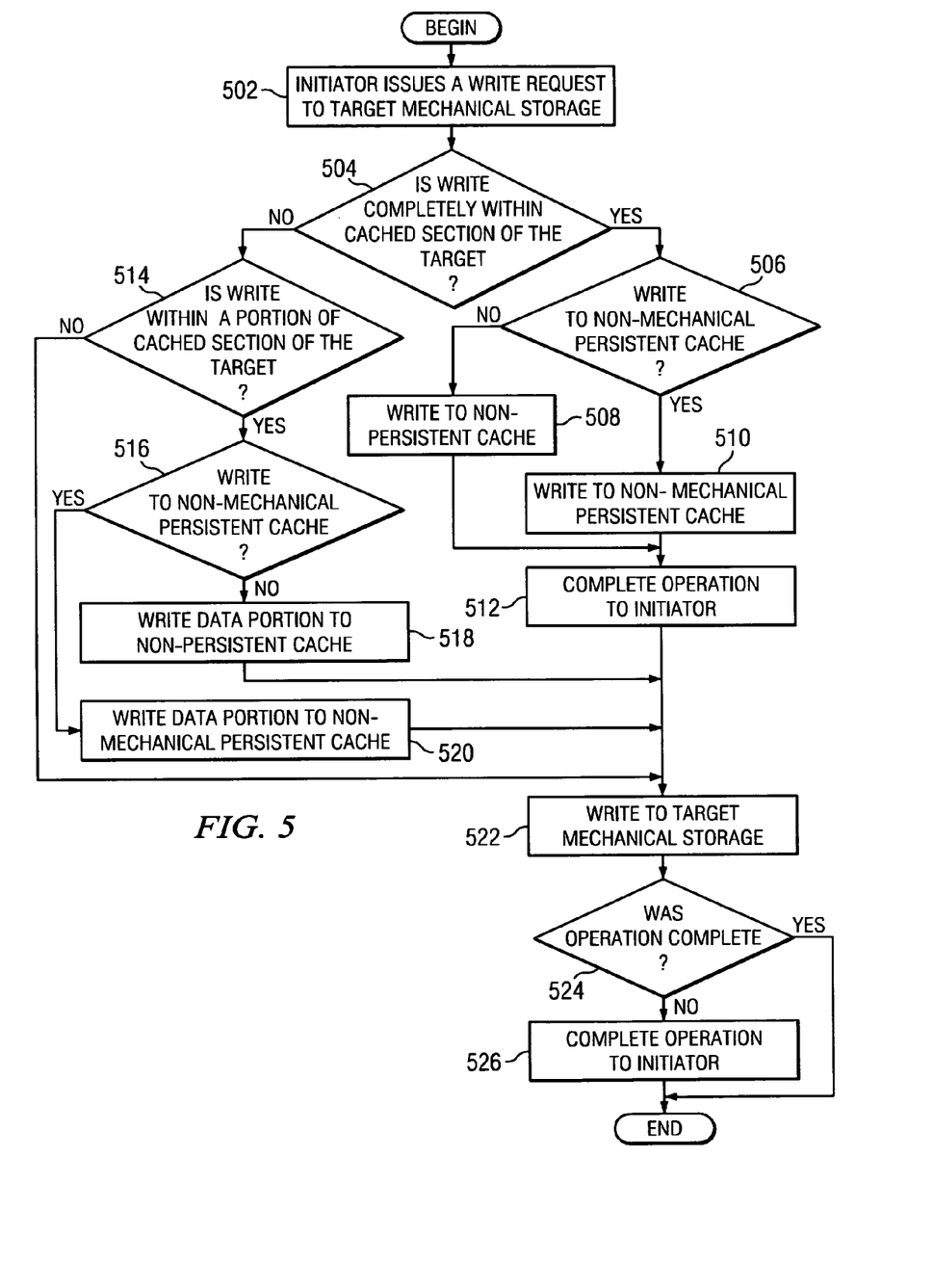
FIG. 5 is a flowchart illustrating the operation of a write phase in accordance with an exemplary embodiment of the present invention.

With reference now to FIG. 5, a flowchart illustrating the operation of a write phase is shown in accordance with an exemplary embodiment of the present invention. To start this phase, an initiator issues a write request to the target storage device (block 502). Next, the device determines whether the data to be written is completely within the tracked range (block 504). If so, a check is made to determine if the data is to be stored on persistent cache (block 506). If the data is not to be stored on persistent cache the, device writes the data to non-persistent cache (block 508) and completes the operation to the initiator (block 512). If the data is to be written to the persistent cache in block 506, then the device writes the data to non-mechanical persistent cache (block 510) and then completes the operation to the SCSI Initiator (block 512).

Returning to block 504, if the data to be written does not fit completely within the tracked range, the device determines if at least a portion of the data is within the tracked range (block 514). If part of the data is within the tracked range, a determination is made to verify if the data is to be written to persistent cache (block 516). If data is not to be written to non-mechanical persistent cache, the device writes the portion of data within the tracked range to non-persistent cache (block 518); otherwise, the device writes the portion of data within the tracked range to non-mechanical persistent cache (block 520).

After the device completes the operation to the initiator in block 512, the device writes to the target mechanical storage (block 522). Also, after the device writes the data to non-persistent cache in block 518 or writes data to non-mechanical persistent cache in block 520, the device writes the data to the target mechanical storage in block 522. In addition, if there is no portion of the write within the tracked range in block 514, operation proceeds to block 522 and the device writes the data to the target mechanical storage.

Thereafter, the device determines whether the write operation has been completed (block 524). If the write operation has been completed, then operation ends. If the write operation has not been completed in block 524, the device completes the write operation to the initiator (block 526) and operation ends.

Figure 6:
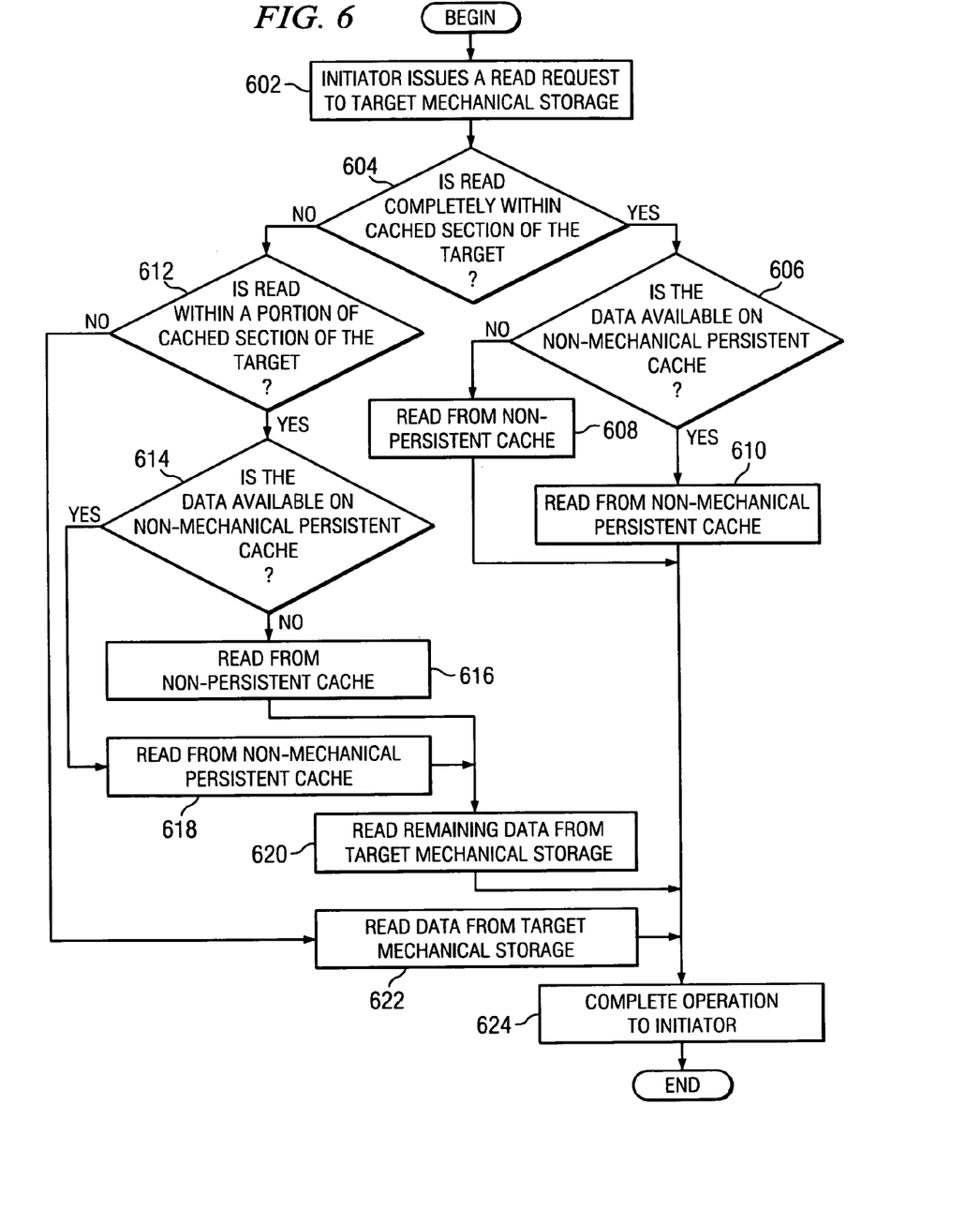
FIG. 6 is a flowchart illustrating operation of a read phase in accordance with an exemplary embodiment of the present invention.

With reference now to FIG. 6, a flowchart illustrating operation of a read phase is shown in accordance with an exemplary embodiment of the present invention. To start this phase, an initiator issues a read request to target storage device (block 602). The device determines whether the data to be read is completely within a range of addresses cached at the target (block 604). If all the data is within the cached range, a determination is made as to whether the data is available in the non-mechanical persistent cache (bock 606). If the data is not available in the non-mechanical persistent cache, the device reads the data from non-persistent cache (block 608); otherwise, the device reads the data from non-mechanical persistent cache (block 610).

Returning to block 604, if the data to be read is not all within the tracked range, a determination is made as to whether at least part of the data is within the cached range (block 612). If part of the data is within the cached range, the device determines if the data exists in persistent memory (block 614). If part of the data cannot be read from persistent memory, the device reads the data portion from non-persistent cache (bock 616) and reads the remaining portion of data from the target storage device default medium (block 620). If part of the data can be read from the non-mechanical persistent cache in block 614, the device reads the data portion from non-mechanical persistent cache (block 618) and reads the remaining portion of data from the target storage device default medium (block 620).

After all the requested data is read in block 608, 610, or 620, the device completes the operation to the initiator (block 624) and operation ends. If none of the data to be read is located in the cached range in block 612, the data is obtained from the device default medium (block 622). The read operation is then completed to the initiator (block 624) and the phase ends.

While the flowcharts in FIGS. 4-6 are shown as being performed by a storage device, the operation of FIGS. 4-6 may take place elsewhere in a data processing system. For example, the operation of FIGS. 4-6 may be performed by the operating system, a device driver, or an application executing in the data processing system. Other modifications to the flowcharts may be made depending upon the implementation of the aspects of the present invention.

Thus, the present invention solves the disadvantages of the prior art by providing a non-mechanical persistent storage or memory in association with a storage device. Certain ranges of data may then be copied to the persistent memory cache, which speeds up access times for those files. The non-mechanical persistent storage may also be connected to a data processing system or computer through other connection interfaces. Thus, data within the range of addresses may be stored in persistent memory cache, which may be removable. The non-mechanical persistent storage may be used for failover. The non-mechanical persistent storage may store vital system recovery data. When the mechanical storage device fails, the non-mechanical persistent memory may be transferred to a replacement storage device.

The invention can take the form of an entirely hardware embodiment, an entirely software embodiment or an embodiment containing both hardware and software elements. In an exemplary embodiment, aspects of the invention may be implemented in software, which includes but is not limited to firmware, resident software, operating system functions and features, device driver software, microcode, etc.

Furthermore, aspects of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include recordable-type media, such as a floppy disk, a hard disk drive, a RAM, CD-ROMs, and DVD-ROMs. Other examples of a computer-readable medium include a semiconductor or solid state memory, magnetic tape, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for selectively caching information in a mechanical storage device, the method comprising;

caching a range of addresses copied from the mechanical storage device in a non-mechanical persistent storage;

receiving an operation including an address range targeting the mechanical storage device;

determining whether the operation targeting the mechanical storage device is within the range of addresses copied from the mechanical storage device;

responsive to the address range of the operation being completely within the copied range of addresses, accessing the non-mechanical persistent storage;

responsive to the address range of the operation not being within the copied range of addresses, accessing a non-persistent cache.

2. The method of claim 1, wherein accessing the non-mechanical persistent storage comprises:

responsive to the operation being a write request, writing data to the mechanical storage device and mirroring the data written to the mechanical storage device in the non-mechanical persistent storage, the data being associated with the address range of the operation targeting the mechanical storage device.

3. The method of claim 2, wherein accessing the non-mechanical persistent storage further comprises:

responsive to the operation being a read request, reading data from the non-mechanical persistent storage.

4. The method of claim 3, wherein responsive to the operation being a read request further comprises;

determining whether read data is entirely within the non-mechanical persistent storage; and responsive to the read data being entirely within the non-mechanical persistent storage, reading the read data from the non-mechanical persistent storage.

5. The method of claim 1, wherein accessing the non-persistent cache comprises:

responsive to the operation being a write request, determining whether data is to be written to the non-mechanical persistent storage, the data associated with the address range of the operation targeting the mechanical storage device;

responsive to determining that the data is not to be written to the non-mechanical persistent storage, writing data to the non-persistent cache; and responsive to the operation being a read request, determining whether read data is available in the non-mechanical persistent storage; and responsive to determining that the read data is not available in the non-mechanical persistent Storage, reading the read data from the non-persistent cache.

6. The method of claim 2, wherein responsive to the operation being a write request further comprises;

determining whether the write request is entirely within the non-mechanical persistent storage; and responsive to the write request being entirely with the non-mechanical persistent storage, writing the data in the non-mechanical persistent storage.

7. The method of claim 2, wherein responsive to the operation being a write request further comprises:

responsive to a portion of the write request being within the non-mechanical persistent storage, writing the portion to the non-mechanical persistent storage.

8. The method of claim 2, wherein accessing the non-mechanical persistent storage further comprises:

responsive to a portion of the requested data being within the non-mechanical persistent storage, reading the portion of the requested data from the nom-mechanical persistent storage and reading a remaining portion of the requested data from a mechanical storage medium within the mechanical storage device.

9. The method of claim 1, wherein the non-mechanical persistent storage persistent storage is removably coupled to the mechanical storage device.

10. The method of claim 1, wherein the mechanical storage device is a hard disk drive, an optical disk drive, or a magnetic tape device.

* * * * *